United States Patent
Inukai (10) Patent No.: US 9,214,835 B2
(45) Date of Patent: Dec. 15, 2015

(54) POWER SUPPLY SYSTEM, IMAGE FORMING APPARATUS HAVING THE POWER SUPPLY SYSTEM, AND CONTROL METHOD OF THE POWER SUPPLY SYSTEM

(71) Applicant: Katsumi Inukai, Iwakura (JP)

(72) Inventor: Katsumi Inukai, Iwakura (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 125 days.

(21) Appl. No.: 14/169,487

(22) Filed: Jan. 31, 2014

(65) Prior Publication Data
US 2014/0210264 A1    Jul. 31, 2014

(30) Foreign Application Priority Data

Jan. 31, 2013 (JP) ................................. 2013-017705

(51) Int. Cl.
*H02J 9/06* (2006.01)
*G03G 15/00* (2006.01)
*H02J 9/00* (2006.01)

(52) U.S. Cl.
CPC ................ *H02J 9/061* (2013.01); *G03G 15/80* (2013.01); *H02J 9/005* (2013.01); *Y10T 307/344* (2015.04)

(58) Field of Classification Search
CPC ................................. H02J 9/061; G03G 15/80
USPC .......................................................... 399/88
See application file for complete search history.

(56) References Cited

U.S. PATENT DOCUMENTS

| | | | |
|---|---|---|---|
| 4,910,654 | A | 3/1990 | Forge |
| 5,032,968 | A | 7/1991 | Mikami et al. |
| 5,231,309 | A | 7/1993 | Soma et al. |
| 5,659,371 | A | 8/1997 | Krause |
| 5,914,538 | A | 6/1999 | Kurosawa et al. |
| 6,115,266 | A | 9/2000 | Matsui et al. |
| 6,353,543 | B2 | 3/2002 | Itoh et al. |

(Continued)

FOREIGN PATENT DOCUMENTS

| | | |
|---|---|---|
| JP | 62-064256 A | 3/1987 |
| JP | 2-250670 A | 10/1990 |

(Continued)

OTHER PUBLICATIONS

Office Action issued in related Japanese patent application No. 2011-245775, Jan. 20, 2015 (with partial English-language translation); 10 pages.

(Continued)

*Primary Examiner* — Emily P Pham
*Assistant Examiner* — Rafael O De Leon Domenech
(74) *Attorney, Agent, or Firm* — Merchant & Gould P.C.

(57) ABSTRACT

A power supply system includes a switching power supply for outputting a predetermined DC voltage by converting an AC voltage from an AC power supply, a latching relay provided on an AC input line for switching a connection state of the switching power supply and the AC power supply in response to a relay drive signal, a storage circuit storing electricity from the switching power supply, a control device for receiving electric power from the storage circuit in a disconnection state, and a relay drive circuit for generating the relay drive signal and outputting it to the latching relay. The control device determines whether an amount of charge of the storage circuit has decreased to a predetermined amount of charge in the disconnection state, and generates and outputs the relay control signal to the relay drive circuit.

8 Claims, 5 Drawing Sheets

(56) References Cited

U.S. PATENT DOCUMENTS

| | | | |
|---|---|---|---|
| 6,408,148 B1* | 6/2002 | Yamamoto | 399/88 |
| 6,476,589 B2 | 11/2002 | Umminger et al. | |
| 7,602,158 B1* | 10/2009 | Iacob | 323/231 |
| 7,639,963 B2* | 12/2009 | Matsuo | 399/88 |
| 8,503,900 B2* | 8/2013 | Inukai | 399/88 |
| 2004/0190923 A1 | 9/2004 | Inukai | |
| 2008/0309163 A1 | 12/2008 | Hashimoto et al. | |
| 2009/0060558 A1* | 3/2009 | Uehara | 399/88 |
| 2009/0128347 A1 | 5/2009 | Bucella | |
| 2009/0168461 A1 | 7/2009 | Nakahori | |
| 2009/0180229 A1 | 7/2009 | Lee | |
| 2009/0230781 A1 | 9/2009 | Hung et al. | |
| 2010/0122096 A1 | 5/2010 | Ozenc | |
| 2010/0256897 A1 | 10/2010 | Takata et al. | |
| 2011/0063759 A1 | 3/2011 | Billingsley et al. | |
| 2011/0110129 A1 | 5/2011 | Busch | |
| 2012/0025630 A1* | 2/2012 | Tsuda | 307/125 |
| 2012/0060786 A1 | 3/2012 | Okada et al. | |
| 2012/0148273 A1* | 6/2012 | Shimura et al. | 399/33 |
| 2012/0206057 A1 | 8/2012 | Kim et al. | |
| 2013/0028623 A1 | 1/2013 | Inukai | |
| 2013/0031396 A1 | 1/2013 | Inukai | |
| 2013/0038318 A1 | 2/2013 | Inukai | |
| 2013/0111237 A1 | 5/2013 | Inukai | |
| 2013/0113292 A1* | 5/2013 | Inukai | 307/82 |
| 2013/0129373 A1 | 5/2013 | Inukai | |
| 2014/0218827 A1 | 8/2014 | Inukai | |
| 2014/0218981 A1 | 8/2014 | Inukai | |
| 2014/0233266 A1 | 8/2014 | Inukai | |

FOREIGN PATENT DOCUMENTS

| | | |
|---|---|---|
| JP | 4-14486 U | 2/1992 |
| JP | 4-51260 A | 2/1992 |
| JP | 7-87734 H | 3/1995 |
| JP | 7-308065 H | 11/1995 |
| JP | 9-23638 H | 1/1997 |
| JP | 2001-005350 A | 1/2001 |
| JP | 2001-025163 A | 1/2001 |
| JP | 2004-151998 A | 5/2004 |
| JP | 2004-187391 A | 7/2004 |
| JP | 2004-274887 A | 9/2004 |
| JP | 2004-303469 A | 10/2004 |
| JP | 2006-129651 A | 5/2006 |
| JP | 2010-172149 A | 8/2010 |
| JP | 2010-239774 A | 10/2010 |
| JP | 2010-252574 A | 11/2010 |
| JP | 2011-120366 A | 6/2011 |
| JP | 2011-125132 A | 6/2011 |
| JP | 2011-199976 | 10/2011 |
| JP | 2011-212951 A | 10/2011 |
| JP | 2013-102650 A | 5/2013 |
| WO | 97-50165 A1 | 12/1997 |

OTHER PUBLICATIONS

Office Action issued in corresponding U.S. Appl. No. 14/171,877, mailed Mar. 31, 2015.

U.S. Office Action issued in related U.S. Appl. No. 13/629,511, mailed Jun. 19, 2015.

U.S. Office Action (Notice of Allowance) issued in related U.S. Appl. No. 14/169,933, mailed Jul. 7, 2015.

* cited by examiner

POWER SUPPLY SYSTEM, IMAGE FORMING APPARATUS HAVING THE POWER SUPPLY SYSTEM, AND CONTROL METHOD OF THE POWER SUPPLY SYSTEM

CROSS-REFERENCE TO RELATED APPLICATIONS

This application claims priority from Japanese Patent Application No. 2013-017705 filed on Jan. 31, 2013, the entire subject-matter of which is incorporated herein by reference.

TECHNICAL FIELD

The present invention relates to a power supply system, an image forming apparatus having the power supply system, and a control method of the power supply system, and particularly, to a technology for reducing the power consumption of a power supply system.

BACKGROUND

As an example of a technology for reducing the power consumption of a power supply system according to the related art, there has been proposed a technology in which, during standby, a main power supply control unit stops oscillation of an output transformer of a switching power supply, and a secondary battery performs supply of electric power to the main power supply control unit, whereby the power consumption is reduced.

SUMMARY

Illustrative aspects of the present invention provide a technology for further reducing the power consumption with respect to a power supply.

According to one illustrative aspect of the present invention, there is provided a power supply system comprising: a switching power supply configured to convert an AC voltage from an AC power supply into a predetermined DC voltage and to output the DC voltage; a latching relay, which is provided on an AC input line, and which is configured to switch a connection state of the switching power supply with respect to the AC power supply in response to an input of a relay drive signal; a storage circuit configured to store electricity by supply of electric power from the switching power supply; a control device configured to receive supply of electric power from the storage circuit in a disconnection state of the switching power supply and the AC power supply; and a relay drive circuit configured to generate the relay drive signal in response to an input of a relay control signal for controlling the latching relay, and to output the relay drive signal to the latching relay. The control device may is configured to perform: a determining process of determining whether an amount of charge of the storage circuit has decreased to a predetermined amount of charge, which is equal to or larger than an amount of charge necessary to drive the latching relay, in the disconnection state; and a connecting process of, in a case where it is determined in the determining process that the amount of charge of the storage circuit has decreased to the predetermined amount of charge, generating the relay control signal for connecting the switching power supply and the AC power supply and outputting the relay control signal to the relay drive circuit.

According to another illustrative aspect of the present invention, there is provided an image forming apparatus comprising: the power supply system according to the above illustrative aspect; and an image forming unit configured to form an image with using the DC voltage supplied from the switching power supply.

According to still another illustrative aspect of the present invention, there is provided a control method of a power supply system. The power supply system comprises: a switching power supply configured to convert an AC voltage from an AC power supply into a predetermined DC voltage and to output the DC voltage; a latching relay, which is provided on an AC input line, and which is configured to switch a connection state of the switching power supply with respect to the AC power supply; and a storage circuit configured to receive supply of electric power from the switching power supply and to store charge for driving the latching relay. The method comprises: determining whether an amount of charge of the storage circuit has decreased to a predetermined amount of charge, which is equal to or larger than an amount of charge necessary to drive the latch circuit, in a disconnection state of the switching power supply and the AC power supply; and connecting the switching power supply and the AC power supply by the latching relay in a case where it is determined by the determining process that the amount of charge of the storage circuit has decreased to the predetermined amount of charge.

DETAILED DESCRIPTION

General Overview

The above-described related art has some disadvantages. For example, even if oscillation of the switching power supply is stopped, it may be feared that a leakage current will flow in a smoothing electrolytic capacitor provided on the primary side of the output transformer. In a case where a leakage current flows, due to the leakage current, unnecessary power may be consumed.

Therefore, illustrative aspects of the present invention provide a technology for further reducing the power consumption with respect to a power supply.

According to a first illustrative aspect of the present invention, there may be provided a power supply system comprising: a switching power supply configured to convert an AC voltage from an AC power supply into a predetermined DC voltage and to output the DC voltage; a latching relay, which is provided on an AC input line, and which is configured to switch a connection state of the switching power supply with respect to the AC power supply in response to an input of a relay drive signal; a storage circuit configured to store electricity by supply of electric power from the switching power supply; a control device configured to receive supply of electric power from the storage circuit in a disconnection state of the switching power supply and the AC power supply; and a relay drive circuit configured to generate the relay drive signal in response to an input of a relay control signal for controlling the latching relay, and to output the relay drive signal to the latching relay. The control device may is configured to perform: a determining process of determining whether an amount of charge of the storage circuit has decreased to a predetermined amount of charge, which is equal to or larger than an amount of charge necessary to drive the latching relay, in the disconnection state; and a connecting process of, in a case where it is determined in the determining process that the amount of charge of the storage circuit has decreased to the predetermined amount of charge, generating the relay control signal for connecting the switching power supply and the AC power supply and outputting the relay control signal to the relay drive circuit.

According thereto, when the switching power supply is not used like during like in a power saving mode, the switching power supply and the AC power supply are disconnected by the latching relay, whereby supply of AC electric power to the switching power supply is completely interrupted. Therefore, it is possible to suppress a current from leaking in the switching power supply, and it is possible to reduce power consumption. Further, since the predetermined amount of charge is appropriately set to an amount of charge equal to or larger than the amount of charge necessary to drive the latching relay, in the disconnection state of the switching power supply and the AC power supply, before the amount of charge of the storage circuit decreases to an amount disabling a relay driving operation of the relay drive circuit, it is possible to connect the switching power supply and the AC power supply. Therefore, it is possible to save electric power for turning on the latching relay, and even if the amount of charge of the storage circuit further decreases to an amount disabling the relay driving operation of the relay drive circuit, it is possible to activate the switching power supply at the same time as activation of the power supply system.

According to a second illustrative aspect of the present invention, the power supply system may further comprise: a detection circuit configured to detect interruption of supply of electric power from the AC power supply to the power supply system. In a case where the interruption is detected by the detection circuit, the control device may determine that the amount of charge of the storage circuit has decreased to the predetermined amount of charge and perform the connecting process.

According thereto, for example, in a case where the amount of charge of the storage circuit decreases to an amount disabling output of a relay drive signal from the relay drive circuit to the latching relay due to a pull out of a power plug from a receptacle in the power saving mode, since the switching power supply and the AC power supply are in the connection state, if the power plug is plugged into the receptacle again, it is possible to activate the switching power supply.

According to a third illustrative aspect of the present invention, the detection circuit may be a circuit for detecting the charged voltage of the storage circuit. The detection circuit may detect the interruption in a case where the detected charged voltage has become a predetermined voltage value or less. In a case where it is detected by the detection circuit that the charged voltage has become the predetermined voltage value or less, the control device may be configured to determine that the amount of charge of the storage circuit has decreased to the predetermined amount of charge in the determining process, and to perform the connecting process.

The charged voltage drops if supply of electric power from the AC power supply to the power supply system is interrupted. Therefore, according to this configuration, it is possible to detect interruption of supply of electric power by detecting the charged voltage.

According to a fourth illustrative aspect of the present invention, the detection circuit may be a circuit which is connected to the storage circuit and for detecting a zero-cross point of the AC power supply. The detection circuit may detect the interruption in a case where any zero-cross point is not detected. In a case where any zero-cross point is not detected by the detection circuit, the control device may be configured to determine that the amount of charge of the storage circuit has decreased to the predetermined amount of charge in the determining process, and to perform the connecting process.

According thereto, since any zero-cross point does not occur if supply of electric power from the AC power supply to the power supply system, if any zero-cross point is not detected, it is possible to detect interruption of supply of electric power.

According to a fifth illustrative aspect of the present invention, the power supply system may further comprise: a low-capacity power supply circuit, which is connected to the AC input line at a preceding stage of the latching relay, and which is configured to supply predetermined electric power in the disconnection state. The low-capacity power supply circuit may comprise the storage circuit. The storage circuit may receive electric power from the AC power supply in the disconnection state.

According thereto, in the disconnection state of the switching power supply and the AC power supply, since charging of the storage circuit is performed directly from the AC power supply, it is possible to suppress the switching power supply from being activated to charge the storage circuit.

According to a sixth illustrative aspect of the present invention, the low-capacity power supply circuit may be a low-capacity AC-to-DC conversion circuit. The low-capacity power supply circuit may comprise: a first capacitor that has a first electrode, which is connected to the AC input line connected to a first end of the AC power supply, and a second electrode; a second capacitor that has a first electrode, which is connected to a second end of the AC power supply, and a second electrode; a rectifying circuit, which is electrically connected between the second electrode of the first capacitor and the second electrode of the second capacitor, and which is configured to rectify an AC voltage applied to the first capacitor and the second capacitor; and a smoothing capacitor, which is connected at a subsequent stage of the rectifying circuit, and which is configured to smooth the AC voltage. The storage circuit may be configured by the smoothing capacitor and is configured to receive supply of electric power through the rectified circuit in the disconnection state.

According thereto, it is possible to implement the low-capacity power supply circuit and the storage circuit by simple configurations.

According to a seventh illustrative aspect of the present invention, there may be provided an image forming apparatus comprising: the power supply system according to the above illustrative aspects; and an image forming unit configured to form an image with using the DC voltage supplied from the switching power supply.

According thereto, in the image forming apparatus, it is possible to reduce the power consumption of the power supply system, and thus it is possible to reduce the power consumption during standby of the image forming apparatus when the switching power supply is not used.

According to an eighth illustrative aspect of the present invention, there may be provided a control method of a power supply system. The power supply system comprises: a switching power supply configured to convert an AC voltage from an AC power supply into a predetermined DC voltage and to output the DC voltage; a latching relay, which is provided on an AC input line, and which is configured to switch a connection state of the switching power supply with respect to the AC power supply; and a storage circuit configured to receive supply of electric power from the switching power supply and to store charge for driving the latching relay. The method comprises: determining whether an amount of charge of the storage circuit has decreased to a predetermined amount of charge, which is equal to or larger than an amount of charge necessary to drive the latch circuit, in a disconnection state of the switching power supply and the AC power supply; and connecting the switching power supply and the AC power supply by the latching relay in a case where it is determined by the determining process that the amount of charge of the storage circuit has decreased to the predetermined amount of charge.

According to the illustrative aspects of the present invention, when the switching power supply is not used, supply of AC electric power to the switching power supply is completely interrupted by the latching relay, whereby it is possible to suppress a leakage current. Further, during power-off, the latching relay is in the ON state, and the switching power supply and the AC power supply are in the connection state. Therefore, during power-on, it is possible to quickly start up the switching power supply, and it is possible to save power for turning on the latching relay. Therefore, it is possible to further reduce the power consumption with respect to the power supply.

Illustrative Embodiments

Illustrative embodiments will be described with reference to FIGS. 1 to 4.

1. Printer

Figure 1:
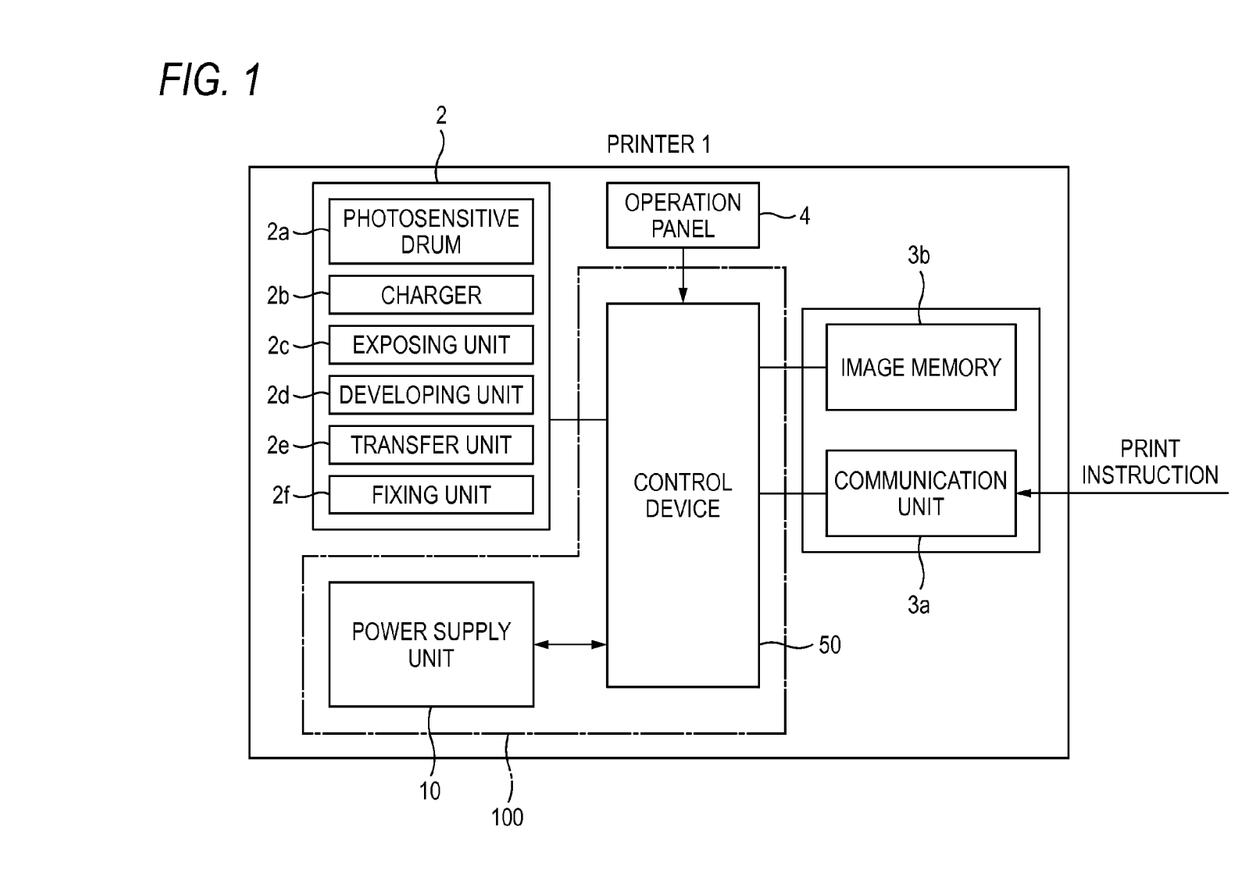
FIG. 1 is a block diagram illustrating a schematic configuration of an image forming apparatus according to an illustrative embodiment.

FIG. 1 is a block diagram illustrating an electrical configuration of a printer 1 which is an example of an image forming apparatus. The printer 1 includes a printing unit 2, a communicating unit 3a, an image memory 3b, an operation panel 4, and a power supply system 100. The power supply system 100 includes a power supply unit 10 and a control device 50. The power supply unit 10 serves as the power supply of the printer 1, and supplies electric power to the printing unit 2, the communicating unit 3a, the image memory 3b, and the control device 50.

The printing unit 2 includes a photosensitive drum 2a, a charging unit 2b for performing a charging process of charging the surface of the photosensitive drum 2a, an exposing unit 2c for performing an exposing process of forming an electrostatic latent image on the surface of the photosensitive drum 2a, a developing unit 2d for performing a developing process of attaching developer onto the electrostatic latent image formed on the surface of the photosensitive drum 2a so as to form a developer image, a transfer unit 2e for performing a transferring process of transferring the developer image onto a recording medium, a fixing unit 2f for performing a fixing process of fixing the developer image transferred on the recording medium, and the like.

The printing unit 2 performs the charging process, the exposing process, the developing process, the transferring process, and the fixing process, thereby performing a printing process of printing an image based on print data onto a recording medium. The communication unit 3a performs communication with an information terminal device such as a PC, and takes on a function of receiving print instructions and print data from the information terminal device. The image memory 3b temporarily stores print data received from the information terminal device.

The operation panel 4 has a plurality of operation buttons including a power switch 5 (see FIG. 2), and an operation command such as a copy command to the printer 1 is issued by operation of the user on the operation panel 4.

In the printer 1, if the communication unit 3a receives a print instruction and receives print data from the information terminal device, the control device 50 controls the printing unit 2 such that the printing unit 2 performs the printing process composed of the charging process, the exposing process, the developing process, the transferring process, and the fixing process so as to print images based on the print data onto recording media. An operating voltage of the printing unit 2 is mainly 24 V; whereas operating voltages of the communication unit 3a, the image memory 3b, and the control device 50 are 5 V and 3.3 V.

The printer 1 has, as operation modes, a normal mode and an OFF mode. The normal mode is a mode in which the printer 1 is able to perform the printing process immediately in response to a print instruction, or in which the printer 1 is performing the printing process. Therefore, in the normal mode, the power supply system 100 operates, and in this state, supply of electric power to the fixing unit 2f is controlled such that the fixing unit 2f is maintained at a temperature at which fixing is possible or a temperature slightly lower than the temperature at which fixing is possible. The OFF mode is a power saving mode which the printer 1 enters if any print instruction is not received for a predetermined period, and in which the printer 1 is in a standby state. In the OFF mode, only a portion of the power supply system 100 operates, and electric power is not supplied to the fixing unit 2f. Incidentally, in the present illustrative embodiment, a normal mode and OFF mode of the power supply system 100 correspond to the normal mode and OFF mode of the printer 1.

Incidentally, the OFF mode is a mode having power consumption less than that in a so-called sleep mode. In the sleep mode, electric power is supplied to the communicating unit 3a; whereas in the OFF mode, electric power is not supplied to the communicating unit 3a and thus data communication with the outside is not possible.

2. Configuration of Power Supply System

Subsequently, the configuration of the power supply system 100 will be described with reference to FIG. 2. As described above, the power supply system 100 includes the power supply unit 10 and the control device 50. First, the configuration of the power supply unit 10 will be described. The power supply unit 10 includes a switching power supply 20, a low-capacity power supply circuit 30, a latching relay 40, and a relay drive circuit 60.

The latching relay 40 is provided on an AC input line Lin, and switches a connection state of the switching power supply 20 with respect to an AC power supply AC, in response to input of a relay drive signal Sd from the relay drive circuit 60. The latching relay 40 includes, for example, a movable piece 41, a contact 42, and a relay coil 43 for driving the movable piece 41. The movable piece 41 is connected to the AC power supply AC, for example, through the AC input line Lin. On the other hand, the contact 42 is connected to the switching power supply 20 through the AC input line Lin.

The latching relay 40 is a so-called self-holding type relay, and whenever the relay coil 43 is excited, the connection state of the movable piece 41 and the contact 42 is switched. After the connection state of the movable piece 41 and the contact 42 is switched, even if the excitation of the relay coil 43 is interrupted, in the latching relay 40, that state is held until the relay coil 43 is excited in next time.

Due to excitation of the relay coil 43, the movable piece 41 and the contact 42 are connected, whereby the switching power supply 20 and the AC power supply AC are connected. Hereinafter, this will be stated as the latching relay (hereinafter, referred to simply as a relay) 40 is turned on, or becomes an ON state. On the other hand, due to excitation of the relay coil 43, the movable piece 41 and the contact 42 are disconnected, whereby the switching power supply 20 and the AC power supply AC are disconnected. Hereinafter, this will be stated as the relay 40 is turned off, or becomes an OFF state.

Figure 2:
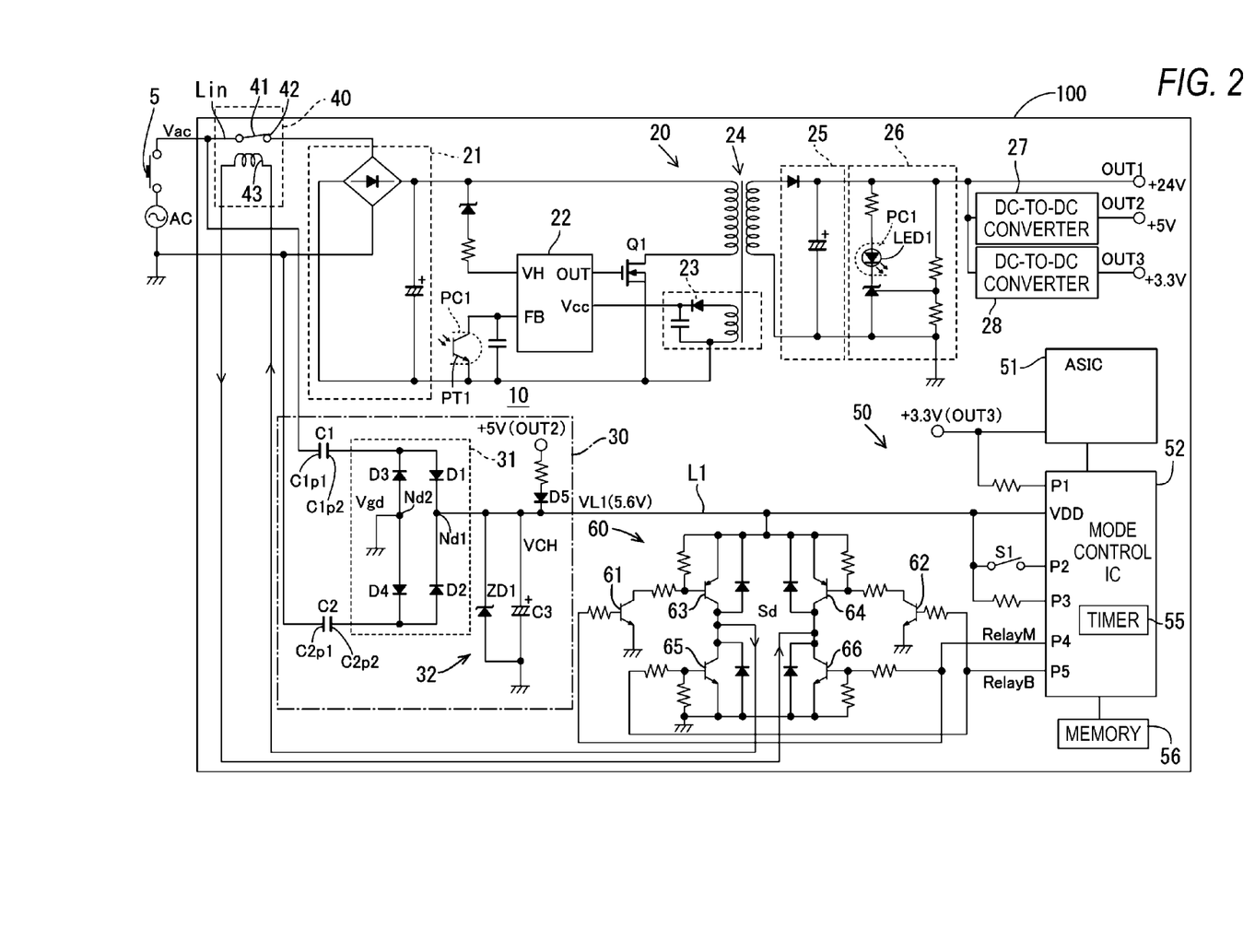
FIG. 2 is a block diagram illustrating a schematic configuration of a power supply system according to the illustrative embodiment.

FIG. 2 shows a case where the relay 40 is in the ON state. In the case where the relay 40 is in the ON state, if the power switch 5 of the printer 1 is turned on, or if the power plug (not shown) of the printer 1 is plugged into a power receptacle, the AC power supply AC and the switching power supply 20 are connected, whereby AC electric power is supplied to the switching power supply 20. In the present illustrative embodiment, in a case where the power switch 5 is turned on, the relay 40 is in the ON state, and thus, if the power switch 5 is turned on, AC electric power is supplied to the switching power supply 20 at the same time when the power switch 5 is turned on.

The switching power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and DC-to-DC converters 27 and 28. The switching power supply 20 is connected to the AC input line Lin through the relay 40.

In the normal mode, the switching power supply 20 rectifies and smoothes an AC voltage Vac of the AC power supply AC so as to generate DC voltages of +24 V, +5 V, and +3.3 V. The DC voltage of +24 V (hereinafter, referred to as DC 24 V) is output from a first output terminal OUT1, the DC voltage of +5 V (hereinafter, referred to as DC 5 V) is output from a second output terminal OUT2, and the DC voltage of +3.3 V (hereinafter, referred to as DC 3.3 V) is output from a third output terminal OUT3.

The rectifying/smoothing circuit 21 is a so-called capacitor input type, and includes a bridge diode for rectifying the AC voltage Vac (for example, 240 V) of the AC power supply AC, and a smoothing capacitor for smoothing the rectified voltage. An output of the rectifying/smoothing circuit 21 is applied to a primary coil of the transformer 24.

The transistor Q1 is an N-channel MOSFET, and is turned on or off in response to an on/off signal (PWM signal) given to the gate of the transistor Q1 by the control IC 22. As a result, the primary side of the transformer 24 oscillates such that a voltage is induced at a secondary coil of the transformer 24.

Moreover, on the primary side of the transformer 24, the voltage generating circuit 23 is provided. The voltage generating circuit 23 rectifies and smoothes a voltage induced at an auxiliary coil provided on the primary side of the transformer 24, thereby generating a power supply voltage Vcc for the control IC 22.

Further, the rectifying/smoothing circuit 25 rectifies and smoothes the voltage induced at the secondary coil of the transformer 24, thereby generating DC 24 V.

The voltage detecting circuit 26 includes a photocoupler PC1, and makes a light emitting diode LED1 of the photocoupler PC1 emit light in response to the detected level of the DC 24 V output by the switching power supply 20. The photocoupler PC1 includes a phototransistor PT1 connected to a feedback port FB of the control IC 22. Therefore, a light signal of the light emitting diode LED1 is converted into an electric signal by the phototransistor PT1, and the detected value of the output of DC 24 V is fed back to the feedback port FB of the control IC 22.

The DC-to-DC converter 27 is configured to convert DC 24 V into DC 5 V and output DC 5 V, and the DC-to-DC converter 28 is configured to convert DC 24 V into DC 3.3 V and output DC 3.3 V.

In an output mode, the control IC 22 makes the primary side of the transformer 24 oscillate to generate each DC voltage, and in an output stop mode, the relay 40 is turned off, whereby supply of power to the control IC 22 is interrupted whereby the operation is stopped. Therefore, in the output stop mode, any DC voltage is not output from the switching power supply 20. When the printer 1 returns from the OFF mode to the normal mode, the relay 40 is turned on, whereby supply of power to the control IC 22 restarts, and oscillation of the primary side of the transformer 24 starts. As a result, each DC voltage is output from the switching power supply 20. Here, the OFF mode and normal operation of the printer 1 correspond to the output stop mode and output mode of the switching power supply 20. Incidentally, during start-up of the switching power supply 20, a power supply voltage is supplied to an input port VH.

Next, the configuration of the control device 50 (an example of a control device) of the power supply system 100 will be described. The control device 50 includes an application-specific integrated circuit (ASIC) 51, and a mode control IC 52 (an example of the control device).

In the normal mode, the ASIC 51 receives DC 3.3 V from the DC-to-DC converter 28 of the switching power supply 20 so as to become an operation state and mainly controls the printing unit 2 of the printer 1. On the other hand, if the switching power supply 20 transitions to the output stop mode, that is, the OFF mode, supply of power from the switching power supply 20 is interrupted, and thus the ASIC 51 becomes a stop state.

The mode control IC 52 is connected to a power supply line L1 which is the output line of the low-capacity power supply circuit 30, and receives DC 5.6 V as power VDD from a smoothing/storage capacitor (an example of a smoothing capacitor and an storage circuit) C3 through the power supply line L1. That is, in the normal mode and the OFF mode, the mode control IC 52 receives supply of electric power from the low-capacity power supply circuit 30.

Further, the mode control IC 52 is connected to the output terminal OUT3 of the switching power supply 20 through a port P1, and monitors on/off of the switching power supply 20. Further, the mode control IC 52 is connected to a switch S1 provided at the operation panel 4, through a port P2, and switches the mode, for example, from the normal mode to the OFF mode in a case where the switch S1 is turned off by operation of the user.

Further, the mode control IC 52 is connected to the power supply line L1 through a port P3, and monitors the voltage of the power supply line L1, that is, the charged voltage VCH of the smoothing/storage capacitor C3. Further, the mode control IC 52 generates a relay control signal RelayM for turning on the relay 40, and a relay control signal RelayB for turning off the relay 40, and outputs the relay control signal RelayM and the relay control signal RelayB to the relay drive circuit 60 through a port P4 and a port P5, respectively.

The relay drive circuit 60 is a known circuit for driving a one-wire latching relay, and includes six transistors 61 to 66, a plurality of protective diodes, and a plurality of protective resistors, and the like.

If the relay drive circuit 60 receives the relay control signal RelayM from the mode control IC 52, the transistors 61, 63, and 66 are turned on, and a relay driving current (the relay drive signal Sd) from the power supply line L1 flows into the ground through the transistor 63, the relay coil 43, and the transistor 66, whereby the relay 40 is turned on. In this case, the switching power supply 20 and the AC power supply AC are connected, and if AC electric power is supplied, the mode transitions to the normal mode in which the switching power supply 20 operates.

On the other hand, if the relay drive circuit 60 receives the relay control signal RelayB from the mode control IC 52, the transistors 62, 64, and 65 are turned on, and the relay driving current from the power supply line L1 flows into the ground through the transistor 64, the relay coil 43, and the transistor 65, whereby the relay coil 43 is excited in the reverse direction, and the relay 40 is turned off. In this case, the switching power supply 20 and the AC power supply AC are disconnected, and the mode transitions to the OFF mode in which the switching power supply 20 stops the operation.

A memory 56 includes a ROM and a RAM. In the ROM, a variety of programs to be executed by the control device 50 are stored, and in the RAM, a variety of data during execution of programs is stored 3. Configuration of Low-Capacity Power Supply Circuit Subsequently, the low-capacity power supply circuit 30 will be described. The low-capacity power supply circuit 30 supplies electric power to the mode control IC 52 and the relay drive circuit 60 in the OFF mode and the normal mode. In the normal mode, the low-capacity power supply circuit 30 supplies electric power from the AC power supply AC directly to them, or supplies electric power from DC 5V of the switching power supply 20 to them through a diode D5. In the OFF mode, the low-capacity power supply circuit 30 supplies electric power from a smoothing capacitor C3 through the rectifying circuit 31.

The low-capacity power supply circuit 30 includes a first capacitor C1, a second capacitor C2, the rectifying circuit 31, and a smoothing circuit 32.

The first capacitor C1 includes a first electrode C1p1 and a second electrode C1p2, and the first electrode C1p1 is connected to one end of the AC power supply AC through the AC input line Lin, and the second electrode C1p2 is connected to the rectifying circuit 31.

The second capacitor C2 includes a first electrode C2p1 and a second electrode C2p2, and the first electrode C2p1 is connected to the other end of the AC power supply AC, and the second electrode C2p2 is connected to the rectifying circuit 31.

The rectifying circuit 31 is electrically connected between the second electrode C1p2 of the first capacitor C1 and the second electrode of the second capacitor C2, and rectifies the AC voltage Vac to be applied to both capacitors C1 and C2. In the present illustrative embodiment, the rectifying circuit 31 is configured by a bridge circuit composed of four diodes D1, D2, D3, and D4. The cathodes of the diode D1 and the diode D2 are connected at a first contact node Nd1, and the anode of the diode D1 is connected to the second electrode C1p2 of the first capacitor C1, and the anode of the diode D2 is connected to the second electrode C2p2 of the second capacitor C2.

Further, the anodes of the diode D3 and the diode D4 are connected at a second contact node Nd2, the cathode of the diode D3 is connected to the second electrode C1p2 of the first capacitor C1, and the cathode of the diode D4 is connected to the second electrode C2p2 of the second capacitor C2. The second contact node Nd2 is connected to the ground. The configuration of the rectifying circuit 31 is not limited to the configuration of FIG. 2.

The smoothing circuit 32 is connected to the rectifying circuit 31 through the voltage line L1, and smoothes the rectified AC voltage, thereby generating a line voltage VL1. In the present illustrative embodiment, the smoothing circuit 32 includes the smoothing/storage capacitor C3 and a zener diode ZD1. In the present illustrative embodiment, the zener voltage of the zener diode ZD1 is set to, for example, 5.6 V. As a result, the charged voltage VCH of the smoothing/storage capacitor C3, that is, the voltage VL1 of the power supply line L1 is set to 5.6 V.

The smoothing/storage capacitor C3 is electrically connected to the +5 V output terminal (second output terminal) OUT2 of the switching power supply 20 through a diode D5. For this reason, immediately after activation of the switching power supply 20, the smoothing/storage capacitor C3 can be charged by the DC 5V of the switching power supply 20.

In charging of the smoothing/storage capacitor C3 through the rectifying circuit 31, due to setting of the low-capacity power supply circuit 30, a charging current is small, and thus rapid charging is not possible. The low-capacity power supply circuit 30 is set such that only a current of, for example, 30 μA (microampere) flows in the first capacitor C1 of the low-capacity power supply circuit 30. Therefore, like during power-on of the printer 1, in a state where the smoothing/storage capacitor C3 has not been charged, the smoothing/storage capacitor C3 is changed by the DC 5V of the switching power supply 20, whereby charging of the smoothing/storage capacitor C3 is quickly performed. That is, during power-on, the smoothing/storage capacitor C3 is changed by the DC 5V of the switching power supply 20, whereby it is possible to more quickly start up the low-capacity power supply circuit 30.

The diode D5 is for preventing a backward flow from the smoothing/storage capacitor C3 toward the DC-to-DC converter 27. Further, the zener diode ZD1 suppresses the power supply line voltage VL1 from rising in a case where the AC voltage Vac of the AC power supply AC rises.

4. Relay Control Process

Figure 3:
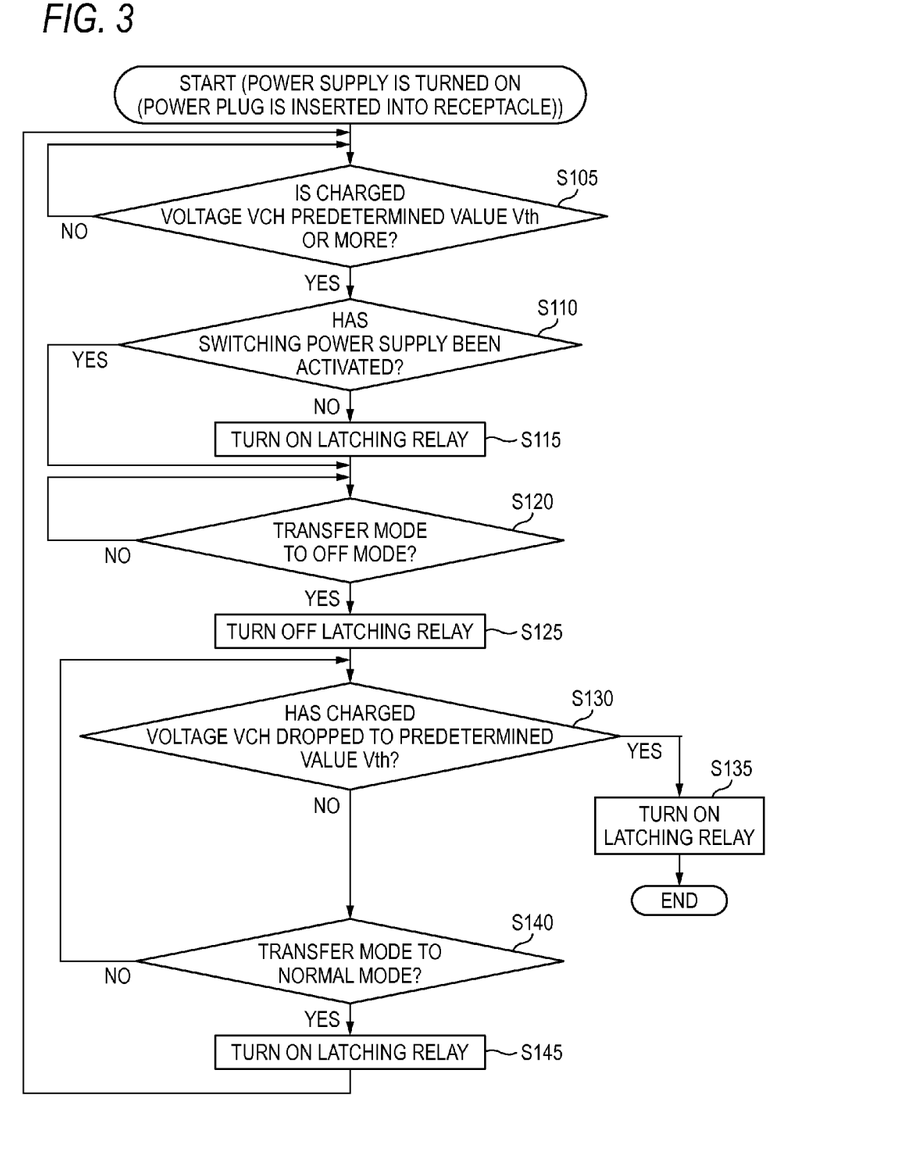
FIG. 3 is a flow chart schematically illustrating a relay control process in the power supply system.

Subsequently, the process of controlling the relay 40 will be described with reference to FIGS. 3 and 4. For example, if the power plug of the printer 1 is inserted into a receptacle, whereby the power supply is turned on (corresponding to a timing t0 of FIG. 4), according to a predetermined program, the relay control process is performed by the mode control IC 52. In the present illustrative embodiment, a case where the normal mode has been set as an operation mode during power-on of the printer 1 is shown. Further, it is assumed that the relay 40 is in an ON state during shipment of the printer 1.

First, in STEP S105, the mode control IC 52 determines whether the charged voltage VCH of the smoothing/storage capacitor C3 is a predetermined value Vth or more. Here, the predetermined value is, for example, 4V. In a case where the charged voltage VCH is not the predetermined value Vth (4V) or more ("NO" in STEP S105), the mode control IC 52 waits for the smoothing/storage capacitor C3 to be charged by supply of electric power from the second output terminal OUT2 of the activated switching power supply 20 such that the charged voltage VCH becomes the predetermined value Vth or more.

Figure 4:
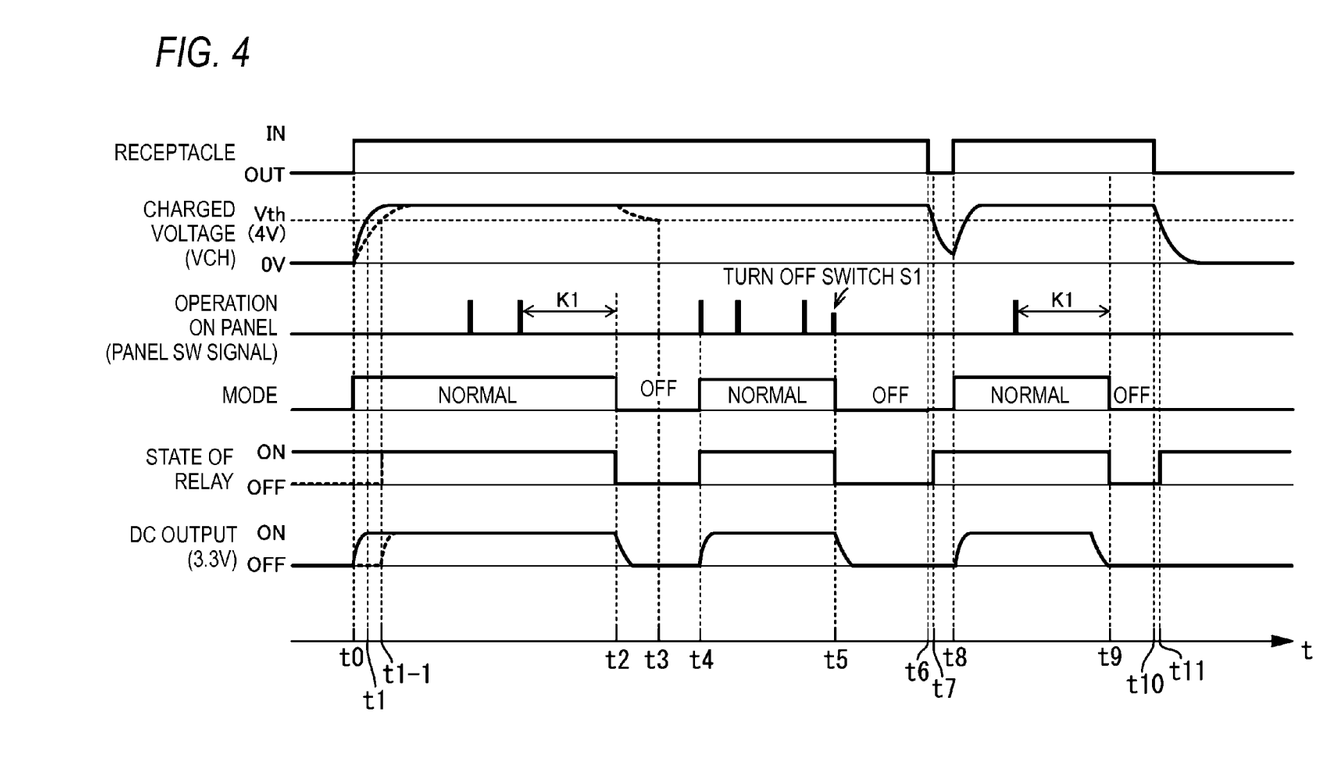
FIG. 4 is a schematic time chart relating to the relay control process.

On the other hand, in a case where the charged voltage VCH reaches the predetermined value (4V) at a timing t1 of FIG. 4, the mode control IC 52 determines that the charged voltage VCH is the predetermined value Vth or more ("YES" in STEP S105), and determines whether the switching power supply 20 has been activated, in STEP S110. This determination is performed by detection on whether the DC 3.3 V of the output terminal OUT3 of the switching power supply 20 is being input to the port P3 of the mode control IC 52.

In a case where the switching power supply 20 has not been activated, that is, the DC 3.3 V is not being input to the port P3 ("NO" in STEP S110), in STEP S115, the mode control IC 52 supplies the relay control signal RelayM to the relay drive circuit 60, thereby turning on the relay 40. As a result, electric power is supplied to the switching power supply 20, whereby the switching power supply 20 is activated.

Here, a case where the charged voltage VCH is the predetermined value Vth (4V) or more, and the switching power supply 20 has not been activated corresponds to a case where although the relay 40 was in the ON state during shipment, the relay 40 became the OFF state for some reason. This case is shown by a broken line in FIG. 4. That is, if the relay 40 is in the OFF state during power-on, the smoothing/storage capacitor C3 is charged through the rectifying circuit 31 of the low-capacity power supply circuit 30. Therefore, the charging takes a longer time as compared to charging by the output of the switching power supply 20, and thus at a timing t1-1 of FIG. 4, the charged voltage VCH reaches the predetermined value Vth (4V), and at this time, the relay 40 is turned on, whereby the switching power supply 20 is activated.

On the other hand, in a case where the switching power supply 20 has been activated, that is, the DC 3.3 V is being input to the port P3 ("YES" in STEP S110), in STEP S120, the mode control IC 52 determines whether to transfer the mode from the normal mode to the OFF mode.

The determination on whether to transfer the mode from the normal mode to the OFF mode is performed, for example, by determining whether a predetermined time K1 has elapsed, without reception of print data or issuing of an operation instruction such as a print instruction by the user, after completion of printing according to a print instruction caused by operation on the panel (a panel SW signal), on the basis of the count value of a timer 55, as shown in FIG. 4. In the normal mode, the panel SW signal shown in FIG. 4 is generated in response to operation of the user on the operation panel 4. Alternatively, the determination on whether to transfer the mode from the normal mode to the OFF mode may be performed by determining whether the switch S1 has been turned off by operation of the user on the operation panel 4, whereby the OFF mode has been selected, for example, as shown at a timing t5 of FIG. 4.

In a case where it is determined not to transfer the mode to the OFF mode ("NO" in STEP S120), the mode control IC 52 waits for the mode to transition to the OFF mode. On the other hand, in a case where the predetermined time K1 has elapsed as shown at a timing t2 of FIG. 4, the mode control IC 52 determines to transfer the mode from the normal mode to the OFF mode ("YES" in STEP S120), in STEP S125, the mode control IC 52 turns off the relay 40. This is the same even at a timing t9 of FIG. 9.

That is, on the occasion of transferring the mode to the OFF mode, the mode control IC 52 generates the relay control signal RelayB for disconnecting the switching power supply 20 and the AC power supply AC, and outputs the relay control signal RelayB to the relay drive circuit 60. As a result, the operation of the switching power supply 20 stops, and in the OFF mode, electric power is supplied to the relay drive circuit 60 and the mode control IC 52 only by the low-capacity power supply circuit 30.

Incidentally, when the mode transitions from the normal mode to the OFF mode, in the interval, a sleep mode period which is a power saving period when a larger amount of electric power is consumed as compared to the OFF mode may be provided. At this time, in a case where the mode transitions to the OFF mode by time measurement, the mode may transition to the OFF mode after measurement of the sleep mode period.

Next, in STEP S130 (an example of a determining process and a determining step), the mode control IC 52 determines whether the charged voltage VCH has dropped to the predetermined value Vth by interruption of supply of electric power from the AC power supply AC to the power supply system 100. Here, the mode control IC 52 determines whether the charged voltage VCH has dropped to the predetermined value Vth, thereby determining whether the amount of charge of the smoothing/storage capacitor C3 has decreased to a predetermined amount of charge which is equal to or larger than an amount of charge necessary to drive the relay 40, in the OFF mode, that is, in the disconnection state of the AC power supply AC and the switching power supply 20.

In a case where it is determined that the charged voltage VCH has dropped to the predetermined value Vth in the disconnection state ("YES" in STEP S130), the mode control IC 52 generates the relay control signal RelayM for connecting the switching power supply 20 and the AC power supply AC. Thereafter, the mode control IC 52 outputs the relay control signal RelayM to the relay drive circuit 60, thereby switching the relay 40 from the OFF state to the ON state in STEP S135 (an example of a connecting process and a connecting step), and then finishes the relay control process. This case corresponds to a timing t7 and a timing t11 of FIG. 4.

That is, for example, if the power plug is unexpectedly pulled out from the receptacle, at a timing t6 of FIG. 4 in the OFF mode, whereby the AC power supply AC is cut off, at the timing t7 when the charged voltage VCH reaches the predetermined value Vth (5V), the mode control IC 52 switches the relay 40 to the ON state. Further, if the power plug is pulled out from the receptacle in order to turn off the printer 1, at the timing t10 of FIG. 4 in the OFF mode, whereby the AC power supply AC is cut off, at the timing t11 when the charged voltage VCH reaches the predetermined value Vth (here, 5V), the mode control IC 52 switches the relay 40 to the ON state. Therefore, in a case where the power supply of the printer 1 is restored at a timing t8 of FIG. 4, or in a case where the power supply of the printer 1 is turned on in next time, the switching power supply 20 immediately starts the operation.

On the other hand, in a case where it is determined that the charged voltage VCH has not dropped to the predetermined value Vth ("NO" in STEP S130), in STEP S140, the mode control IC 52 determines whether to transfer the mode to the normal mode. This determination is performed, for example, by determining whether a user's operation on the panel (a panel SW signal) for performing printing, for example, has been received.

In a case where it is determined not to transition the mode to the normal mode ("NO" in STEP S140), the mode control IC 52 returns to the process of STEP S130. On the other hand, in a case where it is determined to transition the mode to the normal mode ("YES" in STEP S140), the mode control IC 52 generates the relay control signal RelayM and switches the relay 40 from the OFF state to the ON state, in STEP S145, and returns to the process of STEP S105. This case corresponds to a timing t4 of FIG. 4.

Specifically, the determining process of STEP S130 is performed as follows.

That is, the mode control IC (an example of a detection circuit) 52 receives the charged voltage VCH of the smoothing/storage capacitor C3 through the port P3, and monitors the charged voltage VCH, thereby detecting interruption of supply of electric power from the AC power supply AC to the power supply system 100. At this time, the mode control IC 52 determines that the amount of charge of the smoothing/storage capacitor C3 has decreased to the predetermined amount of charge due to the interruption of supply of electric power.

Like this, the mode control IC 52 detects that the charged voltage VCH has become the predetermined value Vth in the OFF mode, thereby determining that supply of electric power from the AC power supply AC to the power supply system 100 has been interrupted, whereby the amount of charge of the smoothing/storage capacitor C3 has decreased to the predetermined amount of charge. This is because if supply of electric power from the AC power supply AC to the power supply system 100 is interrupted in the OFF mode, the means for charging the smoothing/storage capacitor C3 disappears, and charging of the smoothing/storage capacitor C3 stops, whereby the charged voltage VCH of the smoothing/storage capacitor C3 drops. For this reason, by detecting a drop of the charged voltage VCH, it is possible to detect interruption of supply of electric power to the power supply system 100.

In general, the charged power (amount of charge) of the smoothing/storage capacitor C3 decreases in response to a drop of the charged voltage VCH. Therefore, if the predetermined value Vth of the charged voltage VCH corresponding to charged power capable of reliably driving the relay 40 is determined in advance by experiments, even if supply of electric power from the AC power supply AC to the power supply system 100 in the OFF mode is interrupted, it is possible to switch the relay 40 from the OFF state to the ON state. As a result, the switching power supply 20 and the AC power supply AC are connected. Therefore, for example, even if the power plug is pulled out from the receptacle in the OFF mode, whereby the amount of charge of the smoothing/storage capacitor C3 decreases to an amount incapable of driving the relay 40 by the relay drive circuit 60, thereafter, if the power supply is restored, it is possible to activate the switching power supply 20. Further, during normal power-off of the printer 1, it is possible to turn on the relay 40.

5. Advantages

The switching power supply 20 and the AC power supply AC are in the disconnection state in the OFF mode. Therefore, it is possible to suppress a current from leaking to the switching power supply 20, especially, the rectifying/smoothing circuit 21, and it is possible to reduce power consumption. Incidentally, although electric power is always supplied from the AC power supply AC to the low-capacity power supply circuit 30, that electric power is considerably less as compared to power consumption by the rectifying/smoothing circuit 21 and the control IC 22 of the switching power supply 20. Therefore, the power consumption by the low-capacity power supply circuit 30 does not influence on reduction in the power consumption of the power supply system 100.

Further, since the predetermined value Vth (predetermined angle charge) of the charged voltage VCH is appropriately set to a voltage (amount of charge) equal to or larger than the charged voltage VCH (amount of charge) necessary to drive the latching relay 40, in advance, in the OFF mode, before the charged voltage VCH of the smoothing/storage capacitor C3 decreases to a voltage disabling the relay driving operation of the relay drive circuit 60, it is possible to connect the switching power supply 20 and the AC power supply AC. Therefore, it is possible to save electric power for turning on the latching relay 40, and even in a case where the charged voltage VCH further decreases to a voltage disabling the relay driving operation of the relay drive circuit 60, it is possible to activate the switching power supply 20 at the same time as activation of the power supply system 100. That is, it is possible to quickly activate the switching power supply 20 during activation of the power supply system 100.

Modifications to Illustrative Embodiments

The present invention is not limited to the illustrative embodiment described with reference to the drawings, but, for example, the following illustrative embodiments are included in the technical scope of the present invention.

(1) In the above-described illustrative embodiment, an example in which the detection circuit for detecting interruption of supply of electric power from AC power supply to the power supply system is configured by the mode control IC 52, and the detection on interruption is performed by detecting the charged voltage VCH of the smoothing/storage capacitor C3 has been described. However, the present invention is not limited thereto. The detection circuit may be configured by a circuit for detecting zero-cross points of the AC power supply AC. Then, in a case where any zero-cross point is not detected by the circuit for detecting zero-cross points, in the determining process, it may be determined that the amount of charge of the smoothing/storage capacitor C3 is the predetermined amount or less, and the connecting process of STEP S135 may be performed.

Figure 5:
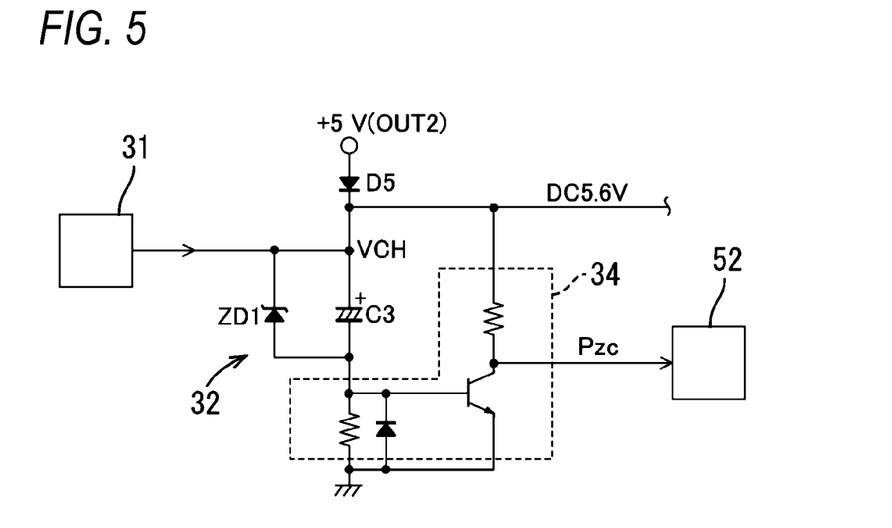
FIG. 5 is a circuit diagram illustrating another detection circuit.

The circuit for detecting zero-cross points can be configured, for example, by a zero-cross detecting circuit 34 and a mode control IC 52 as shown in FIG. 5. The zero-cross detecting circuit 34 is connected to the smoothing/storage capacitor C3, and generates a zero-cross pulse signal Pzc corresponding to a zero-cross point, and supplies the zero-cross pulse signal Pzc to the mode control IC 52. The mode control IC 52 detects a zero-cross point on the basis of the zero-cross pulse signal Pzc.

In this case, if supply of electric power from the AC power supply AC to the power supply system 100 is interrupted, any zero-cross point does not occur. Therefore, if any zero-cross point is not detected, it is possible to detect interruption of supply of electric power.

(2) In the above-described illustrative embodiment, in a case where supply of electric power from the AC power supply AC to the power supply system 100 has been interrupted, in STEP S130, the mode control IC 52 determines whether the charged voltage VCH has dropped to the predetermined value Vth. However, the present invention is not limited thereto. As shown by a dotted line of the charged voltage VCH in the vicinity of a timing t3 of FIG. 4, simply, it may be determined whether the charged voltage VCH has dropped to the predetermined value Vth, in the OFF mode, and in a case where it is determined that the charged voltage VCH has dropped to the predetermined value Vth (corresponding to the timing t3 of FIG. 4), the relay 40 may be turned on.

(3) In the above-described illustrative embodiment, the low-capacity power supply circuit 30 is provided, and an storage circuit is configured by the smoothing/storage capacitor C3 included in the low-capacity power supply circuit 30. However, the present invention is not limited thereto. The low-capacity power supply circuit 30 may be omitted. In this case, the storage circuit needs only to be charged by supply of electric power from the switching power supply, and thus, for example, the storage circuit may be configured by a chargeable battery and a battery charging unit.

(4) In the above-described illustrative embodiment, an example obtained by applying the power supply system 100 disclosed by this specification, to an image processing apparatus has been described. However, the present invention is not limited thereto. The power supply system 100 can be applied to every apparatus having a normal mode and a power saving mode.

(5) In the above-described illustrative embodiment, an example in which the control device is configured by the mode control IC 52 has been described. However, the present invention is not limited thereto. The control device may be configured, for example, only by the ASIC 51 including the operation function of the mode control IC 52. Further, the control device may be configured by a plurality of other circuits, or may be configured by a CPU and other individual circuits.

What is claimed is:

1. A power supply system comprising:
    a switching power supply configured to convert an AC voltage from an AC power supply into a predetermined DC voltage and to output the DC voltage;
    a latching relay, which is provided on an AC input line, and which is configured to switch a connection state of the switching power supply with respect to the AC power supply in response to an input of a relay drive signal;
    a storage circuit configured to store electricity by supply of electric power from the switching power supply;
    a control device configured to receive supply of electric power from the storage circuit in a disconnection state of the switching power supply and the AC power supply; and
    a relay drive circuit configured to generate the relay drive signal in response to an input of a relay control signal for controlling the latching relay, and to output the relay drive signal to the latching relay,
    wherein the control device is configured to perform:
        a determining process of determining whether an amount of charge of the storage circuit has decreased to a predetermined amount of charge, which is equal to or larger than an amount of charge necessary to drive the latching relay, in the disconnection state; and
        a connecting process of, in a case where it is determined in the determining process that the amount of charge of the storage circuit has decreased to the predetermined amount of charge, generating the relay control signal for connecting the switching power supply and the AC power supply and outputting the relay control signal to the relay drive circuit.

2. The power supply system according to claim 1, further comprising:
    a detection circuit configured to detect interruption of supply of electric power from the AC power supply to the power supply system,
    wherein in a case where the interruption is detected by the detection circuit, the control device determines that the amount of charge of the storage circuit has decreased to the predetermined amount of charge and performs the connecting process.

3. The power supply system according to claim 2,
    wherein the detection circuit is a circuit for detecting the charged voltage of the storage circuit,
    wherein the detection circuit detects the interruption in a case where the detected charged voltage has become a predetermined voltage value or less, and
    wherein in a case where it is detected by the detection circuit that the charged voltage has become the predetermined voltage value or less, the control device is configured to determine that the amount of charge of the storage circuit has decreased to the predetermined amount of charge in the determining process, and to perform the connecting process.

4. The power supply system according to claim 2,
    wherein the detection circuit is a circuit which is connected to the storage circuit and for detecting a zero-cross point of the AC power supply,
    wherein the detection circuit detects the interruption in a case where any zero-cross point is not detected, and
    wherein in a case where any zero-cross point is not detected by the detection circuit, the control device is configured to determine that the amount of charge of the storage circuit has decreased to the predetermined amount of charge in the determining process, and to perform the connecting process.

5. The power supply system according to claim 1, further comprising:
    a low-capacity power supply circuit, which is connected to the AC input line at a preceding stage of the latching relay, and which is configured to supply predetermined electric power in the disconnection state,
    wherein the low-capacity power supply circuit comprises the storage circuit, and
    wherein the storage circuit receives electric power from the AC power supply in the disconnection state.

6. The power supply system according to claim 5,
    wherein the low-capacity power supply circuit is a low-capacity AC-to-DC conversion circuit, and
    wherein the low-capacity power supply circuit comprises:
        a first capacitor that has a first electrode, which is connected to the AC input line connected to a first end of the AC power supply, and a second electrode;
        a second capacitor that has a first electrode, which is connected to a second end of the AC power supply, and a second electrode;
        a rectifying circuit, which is electrically connected between the second electrode of the first capacitor and the second electrode of the second capacitor, and which is configured to rectify an AC voltage applied to the first capacitor and the second capacitor; and
        a smoothing capacitor, which is connected at a subsequent stage of the rectifying circuit, and which is configured to smooth the AC voltage, and
    wherein the storage circuit is configured by the smoothing capacitor and is configured to receive supply of electric power through the rectified circuit in the disconnection state.

7. An image forming apparatus comprising:
    the power supply system according to claim 1; and
    an image forming unit configured to form an image using the DC voltage supplied from the switching power supply.

8. A control method of a power supply system,
    wherein the power supply system comprises:
        a switching power supply configured to convert an AC voltage from an AC power supply into a predetermined DC voltage and to output the DC voltage;
        a latching relay, which is provided on an AC input line, and which is configured to switch a connection state of the switching power supply with respect to the AC power supply; and
        a storage circuit configured to receive supply of electric power from the switching power supply and to store charge for driving the latching relay,
    the method comprising:
        determining whether an amount of charge of the storage circuit has decreased to a predetermined amount of charge, which is equal to or larger than an amount of charge necessary to drive the latch circuit, in a disconnection state of the switching power supply and the AC power supply; and connecting the switching power supply and the AC power supply by the latching relay in a case where it is determined by the determining process that the amount of charge of the storage circuit has decreased to the predetermined amount of charge.

* * * * *